(12) United States Patent
Dance et al.

(10) Patent No.: US 7,426,312 B2
(45) Date of Patent: Sep. 16, 2008

(54) CONTRAST ENHANCEMENT OF IMAGES

(75) Inventors: Christopher R. Dance, Meylan (FR); Damian Arregui, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 294 days.

(21) Appl. No.: 11/174,679

(22) Filed: Jul. 5, 2005

(65) Prior Publication Data

US 2007/0009167 A1 Jan. 11, 2007

(51) Int. Cl.
*G06K 9/40* (2006.01)
(52) U.S. Cl. ...................... 382/254; 382/274
(58) Field of Classification Search ............... 382/274, 382/254
See application file for complete search history.

(56) References Cited

U.S. PATENT DOCUMENTS

| | | | |
|---|---|---|---|
| 2,297,691 A * | 10/1942 | Carlson | 430/55 |
| 5,450,502 A | 9/1995 | Eschbach et al. | |
| 6,204,940 B1 | 3/2001 | Lin et al. | |
| 6,205,257 B1 | 3/2001 | Eschbach | |
| 6,646,762 B1 * | 11/2003 | Balasubramanian et al. | 358/1.9 |
| 6,738,161 B1 | 5/2004 | Moriwaki | |
| 6,748,119 B1 | 6/2004 | Bollman | |
| 7,139,416 B2 * | 11/2006 | Vuylsteke | 382/128 |
| 2003/0108250 A1 | 6/2003 | Luo et al. | |
| 2003/0161497 A1 * | 8/2003 | Vuylsteke | 382/100 |
| 2004/0120599 A1 | 6/2004 | Henley | |
| 2005/0013506 A1 * | 1/2005 | Yano | 382/274 |
| 2005/0128496 A1 * | 6/2005 | Bala | 358/1.9 |
| 2005/0163393 A1 * | 7/2005 | Asari | 382/254 |

OTHER PUBLICATIONS

Zuiderveld, Karel, "Contrast Limited Adaptive Histogram Equalization", Computer Vision Research Group, Utrecht University, Utrecht, The Netherlands, Copyright 1994 by Academic Press, Inc. VIII.5, Image Processing, pp. 474-485.
Durand, Fredo et al., "Fast Bilateral Filtering for the Display of High-Dynamic-Range Images", SIGGRAPH 2002 Conference Graphics Proceedings, pp. 257-265. ACM Press, 2002.
Tomasi, C. et al., "Bilateral Filtering for Gray and Color Images", Proceedings of the 1998 IEEE International Conference on Computer Vision, Bombay, India, pp. 836-846.
Schell, Michael J. et al., "The Reduced Monotonic Regression Method", Journal of the American Statistical Association, Mar. 1997, vol. 92, No. 437, Theory and Methods, pp. 128-135.

(Continued)

*Primary Examiner*—Samir A Ahmed
*Assistant Examiner*—Stephen R Koziol
(74) *Attorney, Agent, or Firm*—Fay Sharpe LLP

(57) ABSTRACT

A method and system for contrast enhancement of an input image that utilizes luminance values of pixels of the input image to derive transforms. The method down-samples and partitions an image into sub-images whereby transforms are generated for selected sub-images. The selected sub-image transforms are used to generate an output transform which is applied to the input image for local contrast enhancement of the image. Furthermore, a decision method as to whether or not the input image is to receive local contrast enhancement wherein darkness features of the input image are compared to threshold values and combined into an expression which results in the determination.

11 Claims, 5 Drawing Sheets

OTHER PUBLICATIONS

Perona, Pietro et al., "Scale-Space and Edge Detection Using Anisotropic Diffusion", Electrical Engineering and Computer Science Department, University of California at Berkeley, Berkeley, California. 94720, Dec. 20, 1988, pp. 1-30.

Devlin, Kate, "A Review of Tone Reproduction Techniques", Department of Computer Science, University of Bristol, Nov. 2002, pp. 1-13.

* cited by examiner

CONTRAST ENHANCEMENT OF IMAGES

BACKGROUND

The present disclosure relates to the field of image processing, and more specifically to digital image processing. It finds particular application in conjunction with an apparatus and/or method for improving image contrast and will be described with reference thereto. However, those skilled in the art will appreciate that it is also amenable to other like applications.

A common reason for not using or liking photographs or other digital images is "poor lighting". This usually means that an image has regions that are too dark or too light. Often such defects can only be improved or enhanced by local image processing and not by a single global histogram transformation. Additionally, more digital photographs with 14-bits per channel, or high dynamic range (HDR) images are being produced. These images are best reduced for 8-bit printing by local dynamic range compression.

HDR images can easily contain four orders of magnitude in light intensity, while displays and prints are limited to two to three orders of magnitude in emissive or reflective intensity. Capture devices that handle the HDR of light intensities are being developed. Slide film, for example, has a substantially higher dynamic range than print or most display devices, giving a source of relatively high dynamic range images. Given such an image, the challenge is to reproduce and/or output the image without losing the details in the highlights and shadows.

Many techniques for local contrast enhancement and dynamic range compression have been proposed in the prior art, however, most of these suffer from artifacts. Some techniques known in the art, such as bilateral filtering, have been shown to avoid these artifacts but at some computational expense. Furthermore, it has been shown that applying local contrast enhancement indiscriminately may actually "damage" or lessen the appeal of the enhanced image to users and/or observers. For example, in some tests, users may note that "artistic shadows" are appealing and that "grey highlights in the hair" and "reduction in specular appearance of shiny surfaces" are not. In such cases, a user and/or observer will prefer the results of a global contrast enhancement.

REFERENCES

C. Tomasi and R. Manduchi, "Bilateral Filtering for Gray and Color Images", in the Proceedings of the 1998 IEEE International Conference on Computer Vision, Bombay, India, describes a method for smoothing images while preserving edges.

F. Durand and J. Dorsey, "Fast Bilateral Filtering for the Display of High-Dynamic-Range Images", in ACM Transactions of Graphics, July 2002, describes a technique for the display of high-dynamic-range images, which reduces the contrast while preserving detail.

M. Schell and B. Singh, "The reduced Monotonic Regression Method", in Journal of the American Statistical Association, March 1997, describes two non-parametric methods, reduced isotonic regression and reduced monotonic regression, for relating two monotonic variables.

U.S. Pat. No. 6,738,161 B1, filed Mar. 29, 2000 and issued May 18, 2004, for "Apparatus and Method for Processing Contrast Correction of Image", to Moriwaki, discloses an apparatus and method for image correction with optimum contrast.

INCORPORATION BY REFERENCE

U.S. Pat. No. 5,450,502, filed Oct. 7, 1993 and issued Sep. 12, 1995, for "Image-Dependent Luminance Enhancement", to Eschbach et al., which is incorporated herein in its entirety by reference, discloses a method for contrast enhancement which derives a tone reproduction curve from a smoothed version of the luminance histogram of selected parts of an input image.

BRIEF DESCRIPTION

According to aspects illustrated herein, there is provided a method for contrast enhancement of an input image. The method comprises down-sampling luminance components of pixels in the input image and applying a low-pass filter to the down-sampled image to produce a filtered image. The down-sampled image is partitioned into sub-images and transforms are generated and/or derived for at least one of the sub-images. The sub-image transform maps pre-filtered luminance values of the sub-image to post-filtered luminance values of the sub-image. The method further comprises selecting at least one of the sub-image transforms and generating an output transform from the selected sub-image transforms and applying the output transform to the input image.

Further aspects illustrated herein, provide for a system for contrast enhancement of an input image. The system comprises a down-sampler configured to down-sample the luminance components of a color converted image and a bilateral filter configured to low-pass filter the down-sampled image. The system further comprises a partitioner configured to partition the down-sampled image into sub-images and a transform generator. The transform generator is configured to generate sub-image transforms which map pre-filtered luminance values of the sub-images to post-filtered luminance values of the sub-images. The transform generator is further configured to select at least one of the sub-image transforms and generate an output transform from the selected sub-image transforms and apply the output transform to the input image.

Further aspects illustrated herein, provide for a method for determining if an input image is to receive local contrast enhancement. The method comprises applying a bilateral filter to a low-resolution version of the input image and partitioning the pixels of the filtered image into categories based on the luminance values of the pixels. The method further comprises computing characteristic darkness features of the filtered image based on the categories of luminance values and comparing the darkness features to threshold values for determining if the input image is to receive local contrast enhancement.

DETAILED DESCRIPTION

Figure 1:
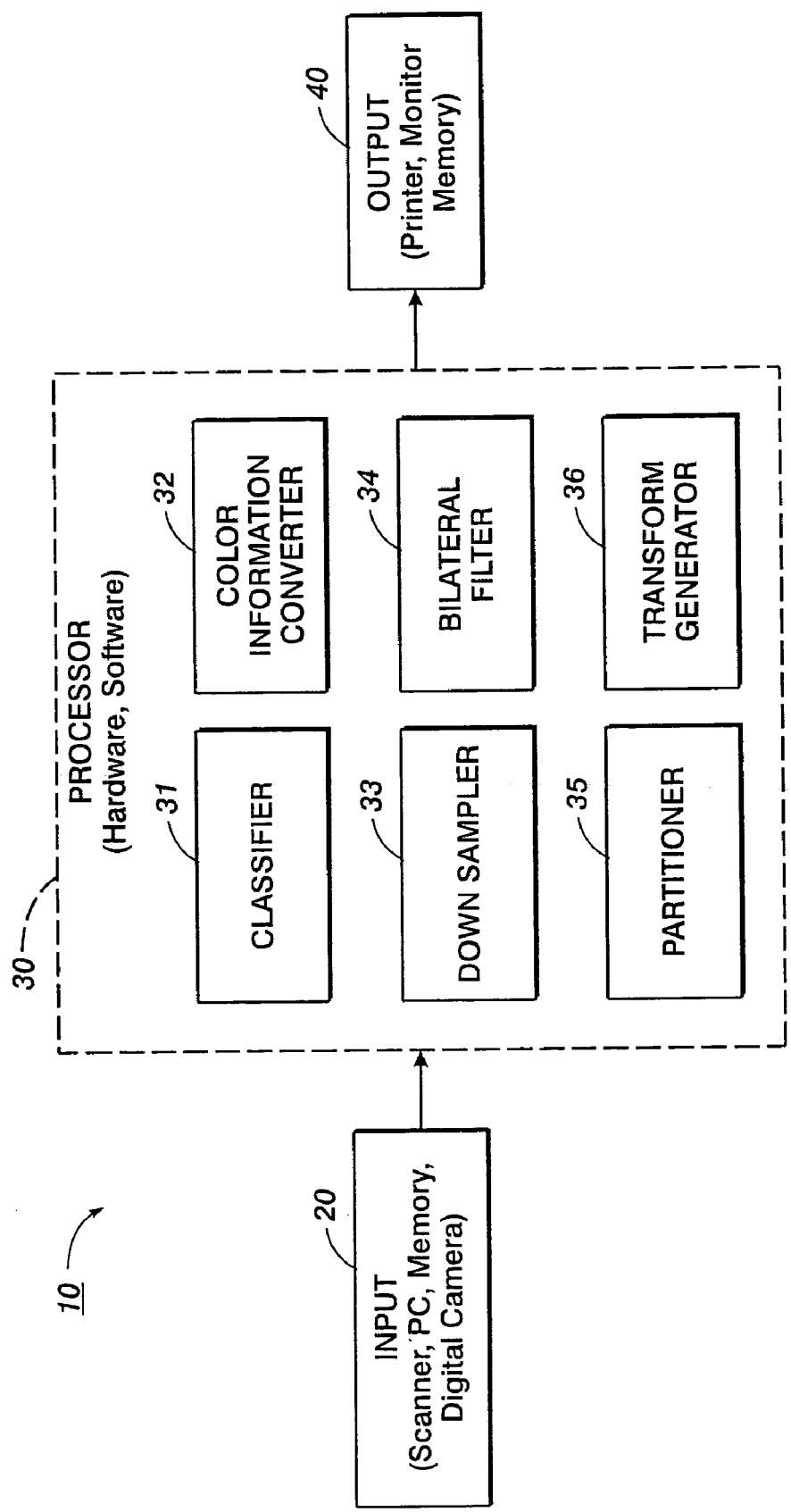
FIG. 1 is a block diagram of a system suited to practice aspects of an exemplary embodiment.

Referring now to the drawings where the showings are for the purpose of describing the disclosed embodiments of the present method and/or apparatus and not for limiting the same.

With reference to FIG. 1, a printing system and/or an image enhancement system 10 includes an image input device 20, such as a scanner, digital camera or personal computer, which receives and/or inputs a digital image, such as a digital photograph or the like, into the system. The input image may alternately be retrieved from memory of a personal computer or a digital camera. The input image may be color or black-and-white and may be input as signals in red-green-blue (RGB) color space for color images or in some form of gray scale, i.e. intensity space, for black-and-white images. It is understood that color information and/or color intensity as referred to herein may indicate and/or include black-and-white information in the appropriate instances as would be known by one of ordinary skill in the art. As shown, the input image is directed toward a processing device 30, which applies a method or process for contrast enhancement of the input image. For example, the processing device 30 may be implemented as software that acts upon the input image to enhance the image, including contrast enhancement. Suitably, the processing device 30 may comprise hardware and/or may comprise several devices. For example, the processing device 30 may comprise a classifier 31 configured to determine if an input image is to receive local contrast enhancement, a color information converter 32 configured to convert pixel color information from a RGB color space to a luminance color space and a down-sampler 33 configured to down-sample the image to a low-resolution version of the image to improve computational speed of the system/method. Furthermore, the processing device 30, may comprise a bilateral filter 34 configured to low-pass filter the image while preserving edges in the input image, a partitioner 35 configured to section an input image into sub-images or sub-sections for further processing and a transform generator 36 configured to generate and/or apply contrast enhancement transforms to the image and/or sub-images of the input image. It is understood that some and/or all of these devices may or may not be implemented in the processing device 30, and some and/or all of these may be implemented as software. The enhanced image is then directed and/or submitted to an output device 40, such as a printer or a video monitor where the enhanced image is displayed, or the image can be directed to a memory or other storage device. The output device 40 may, for example, be a printer that is xerographic or an ink-jet, or combination of both. Also, the input device, the processor and the output device may be integrated into a multifunction device that includes functionality for printing and/or viewing.

Figure 2:
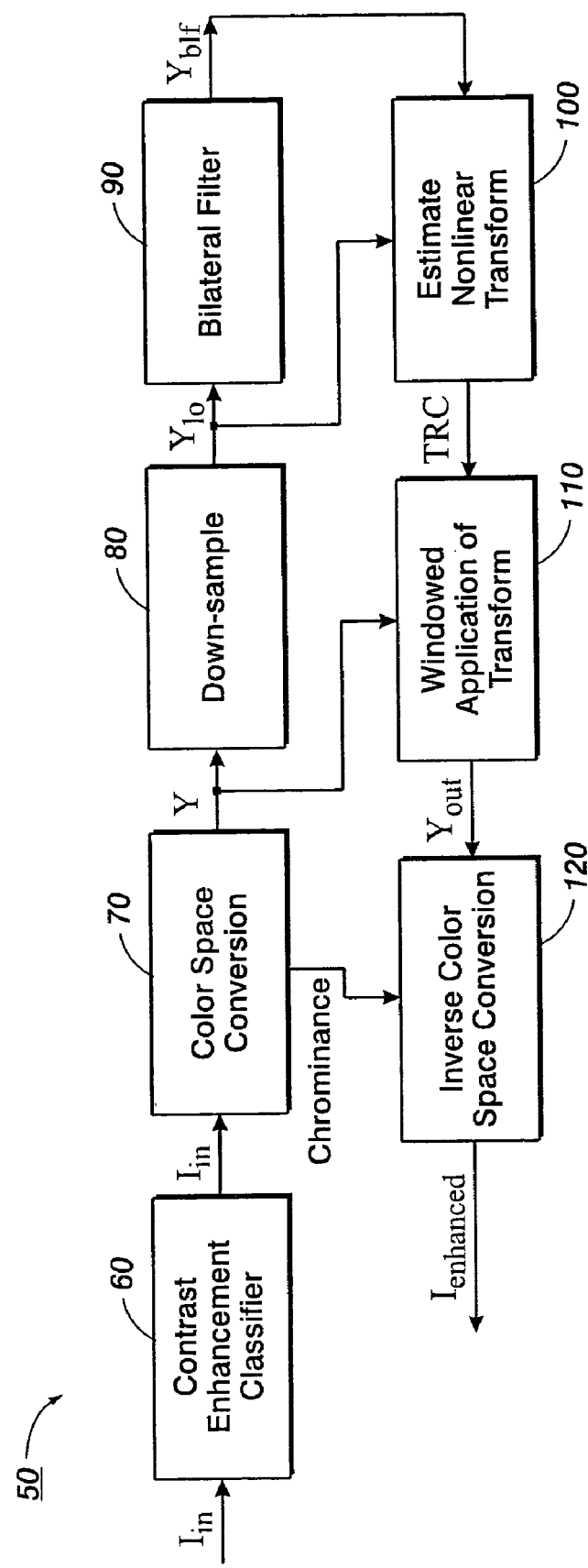
FIG. 2 is a block diagram of a method of an exemplary embodiment.

With reference to FIG. 2, a method for local contrast enhancement 50 of an input image is shown. Step 60 is to efficiently determine if the input image will benefit from and not significantly risk damage from local contrast enhancement and therefore receive local contrast enhancement. To benefit from the contrast enhancement process, an image will become more appealing to the user and/or observer of the image. Step 60 is further detailed below with reference to FIGS. 3 and 4.

After it is determined that the input image is to receive local contrast enhancement in step 60 of FIG. 2, the method/process moves to step 70. In which the color information of the pixels in the image are converted to a luminance color space, such as YIQ, YES or Lab. Suitably, if the color information of the pixels is received in a proper color space, i.e. one having a luminance component, the converting process may be optionally ignored or skipped. In the exemplary embodiment, the color information of the input image is received in RGB color space. In RGB color space, each pixel's color is determined by a red component, a green component and a blue component as is well known in the art. This information is converted to a color space having a luminance or brightness value, Y or L, and chrominance values, (e.g. I, Q or E, S or a,b or u,v) which refer to hue and saturation values. In the exemplary embodiment the color information is converted into the YIQ color space. YIQ is similar to the YUV color space except that it is rotated 33 degrees clockwise. Therefore, in the YIQ color space, Y represents the luminance value, I represents the chrominance value along the orange-blue color axis and Q represents the chrominance value along the purple-green color axis.

After the color information has been converted to a luminance color space, in step 80 the luminance or brightness values of the color converted input image (Y) are down-sampled to give a down-sampled version of the input image ($Y_{lo}$). The down-sampled version of the input image is a low-resolution version where some of the luminance values of the pixels have been discarded. The down-sampling provides image information that can be processed in the exemplary embodiment with less computational expense. In the exemplary embodiment, the image is down-sampled by an integer factor to some suitable target resolution, such as 320× 240. The down-sampling is done prior to sub-sampling of the image.

In step 90, the down-sampled image is low-pass filtered using a bilateral filter. In "Bilateral Filtering for Gray and Color Images" by Tomasi and Manduchi, combined domain and range filtering is denoted as bilateral filtering. The idea underlying bilateral filtering is to do in the range of an image what traditional filters do in its domain. Two pixels can be close to one another, that is, occupy nearby spatial location, or they can be similar to one another, that is, have nearby values, possibly in a perceptually meaningful fashion. Closeness refers to vicinity in the domain and similarity refers to vicinity in the range. Traditional filtering is domain filtering, and enforces closeness by weighting pixel values with coefficients that fall off with distance. Similarly, range filtering is defined by averaging image values with weights that decay with dissimilarity. Range filters are nonlinear because their weights depend on image intensity or color. Bilateral filtering replaces the pixel value at x with an average of similar and nearby pixel values. Therefore, in smooth regions, pixel values in a small neighborhood are similar to each other and as a consequence, the bilateral filter acts essentially as a standard domain filter, and not only averages away the correlated differences between pixel values caused by noise, but also averages out weak features whose contrast is to be enhanced. Consider now a sharp boundary between a dark and a bright region in an image. When the bilateral filter is centered, say, on a pixel on the bright side of the boundary, a similarity function assumes values close to one for pixels on the same side of the boundary, and close to zero for pixels on the other or dark side of the boundary.

Also, Fredo Durand and Julie Dorsey describe bilateral filtering in the article "Fast Bilateral Filtering for the Display of High-Dynamic-Range Images", in ACM Transactions of Graphics, July 2002. In their article, Durand and Dorsey state that bilateral filtering was developed by Tomasi and Manduchi as an alternative to anisotropic diffusion [1998]. It is a non-linear filter where the output is a weighted average of the input. They start with standard Gaussian filtering with a spatial kernel f. However, the weight of a pixel depends also on a function g in the intensity domain, which decreases the weight of pixels with large intensity differences. We note that g is an edge-stopping function similar to that of Perona and Malik, in "Scale-space and edge detection using anisotropic diffusion", IEEE Transactions on Pattern Analysis and Machine Intelligence, July 1990. The output of the bilateral filter for a pixel s is then:

$$J_s = \frac{1}{k(s)} \sum_{p \in \Omega} f(p-s) g(I_p - I_s) I_p,$$

where k(s) is a normalization term:

$$k(s) = \sum_{p \in \Omega} f(p-s) g(I_p - I_s).$$

In the above equations, $J_s$ is the output of the bilateral filter for a pixel of interest s. f(p−s) is a function that provides a weight value for a pixel p based on the spatial distance of pixel p from the pixel of interest s wherein pixel p is an element of a small neighborhood, $\Omega$, of the pixel of interest s. $g(I_p-I_s)$ is a function that provides a weight value for a pixel p based on the difference in luminance intensity, $I_p-I_s$, of the pixel p and the pixel of interest s wherein the pixel p is an element of a small neighborhood, $\Omega$, of the pixel of interest s. For each pixel p, the two weight values are multiplied with the luminance intensity of the pixel p, $I_p$, and these products are summed and normalized (multiplied by the normalization term $k^{-1}(s)$) to give the output of the bilateral filter. In practice, they use a Gaussian for f in the spatial domain, and a Gaussian for g in the intensity domain. Therefore, the value at a pixel s is influenced mainly by pixels that are close spatially and that have a similar intensity. This is easy to extend to color images, and any metric g on pixels can be used (e.g. CIE-LAB).

As described above, bilateral filtering preserves edges in the image by giving suitably more weight and/or influence to pixels which are closer to the pixel of interest and to pixels which have similar luminance values to the pixel of interest. Suitably less weight and/or influence is given to pixels which are spaced further from the pixel of interest and to pixels which have greater difference in luminance values from the pixel of interest. For example, in the edge areas of an image, pixels with darker luminance values and pixels with lighter luminance values may be relative close to or even next to each other. Given that these pixels have greatly differing luminance values, even though they may be spatially close to the pixel of interest, they will have less influence in computing the output pixel's luminance value than pixels that have luminance values close to or equal to the pixel of interest's luminance value. On the other hand, pixels in the background areas will have a relatively small difference in luminance values. Therefore, they will have a greater weight and/or influence on the pixel of interest's output value. In the exemplary embodiment, the down-sampled image $Y_{lo}$ is filtered using a bilateral filter resulting in the filtered image $Y_{blf}$.

Figure 4:
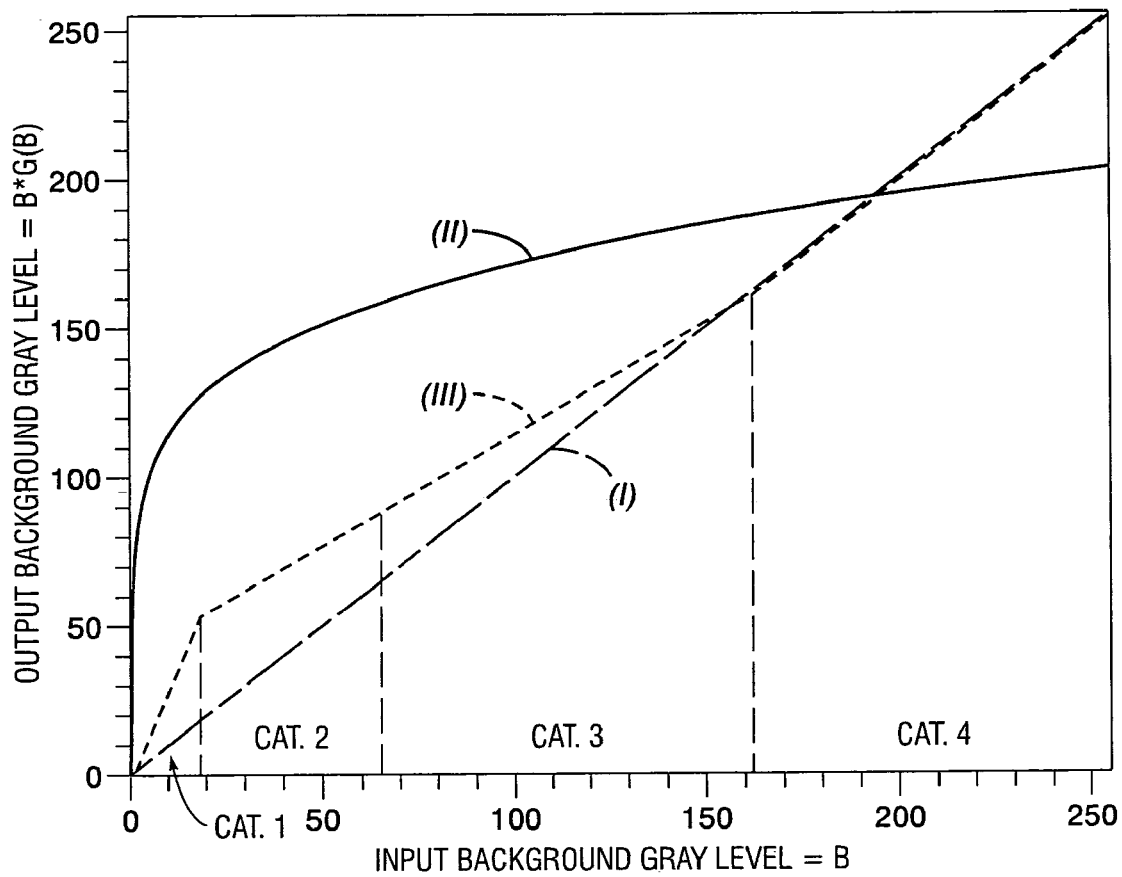
FIG. 4 is a graph of luminance gain curves of an exemplary embodiment.
Figure 5:
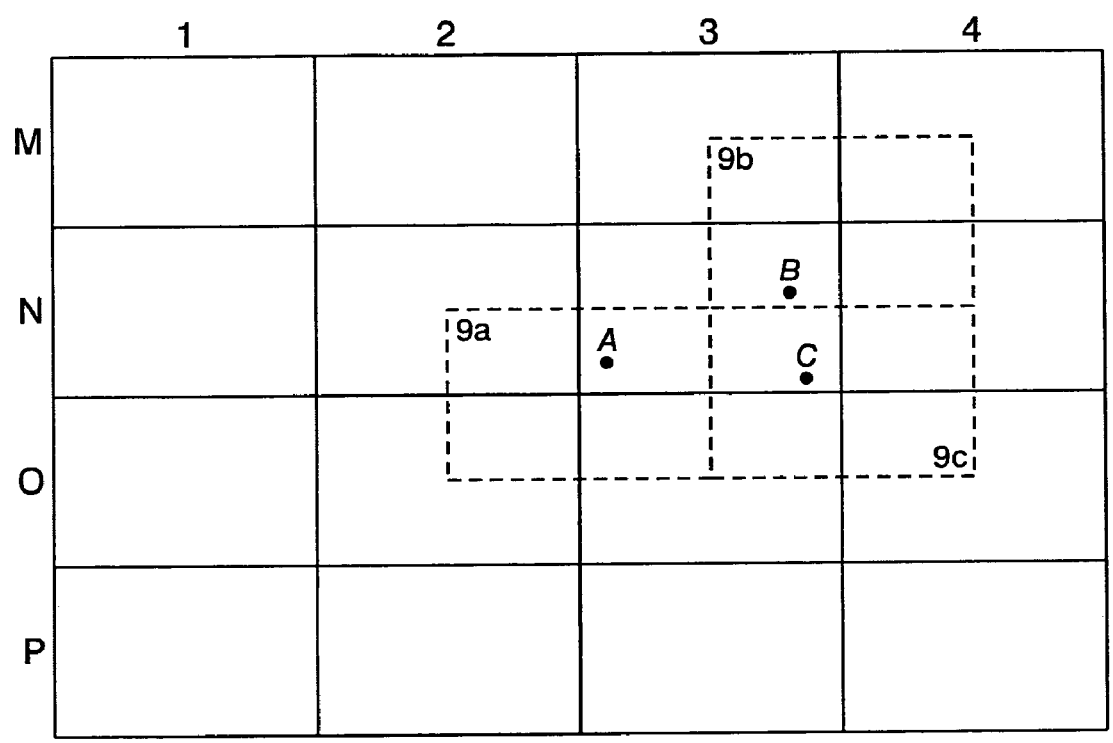
FIG. 5 is a diagram of the partitioning of an image into sub-images, indicating which sub-images correlate to pixels of interest of an exemplary embodiment.

In step 100, a nonlinear transform is estimated for mapping input luminance values to output luminance values. The down-sampled and filtered image is partitioned into sub-images and/or sub-areas. Suitably, the sub-images may be adjacent to each other and may be of different shapes and sizes. FIGS. 4 and 5 of U.S. Pat. No. 5,450,502, which is incorporated herein in its entirety by reference, shows exemplary embodiments of partitioned sub-images and/or sub-areas. For each sub-image a sub-image transform is estimated by mapping input luminance values to output luminance values. In the exemplary embodiment, a histogram is derived for each sub-image by plotting the number of pixels at each possible luminance value in the sub-image. From the histogram, a monotonic tone reproduction curve (TRC) for the sub-image is estimated which maps $Y_{lo}$ (down-sampled image) to $Y_{blf}$ (bilaterally filtered image) in, for example, a least squares fit or model. Suitably, the TRC may be estimated using monotonic dynamic programming. Dynamic programming chooses the "best" path from a group of possible inputs to a group of possible outputs. The path has intermediate states or nodes, wherein a cost is associated with movement from one state to another along the path. The dynamic programming algorithm chooses a path having the least cost associated with it. For example, in the exemplary embodiment dynamic programming is used to estimate a TRC for a sub-image mapping $Y_{lo}$ to $Y_{blf}$ wherein the movement from one value of $Y_{lo}$ to the next is chosen such that the squares of the variance are as small as possible. In another embodiment, a regularizer may be used for the monotonic dynamic programming. In yet another embodiment, if the least squares model cannot produce an acceptable fit for the data the sub-images may be further partitioned into smaller sub-images until an acceptable fit is found.

After the nonlinear transforms have been estimated for the sub-images, in step 110, a selection of sub-image transforms are combined to form an output transform which is applied to a pixel of interest in the input image. Suitably, one, two, three, four or possibly more sub-image transforms neighboring the pixel of interest may be combined to form the output transform. Furthermore, the sub-image transforms may be suitably weighted. For example, they may be weighted according to the distance of the respective sub-image's center from the pixel of interest. Alternatively, the sub-image transforms may not be weighted at all. In the exemplary embodiment, the monotonic TRCs of the four neighboring sub-images to the pixel of interest are combined into an output transform. For example referring to FIG. 5, an input image (not shown for explanation purposes) is divided into sub-images or sub-areas. Suitably, the sub-images are formed of equal sized and shaped rectangles, although other shapes and sizes may be employed as described above. The sub-images are labeled M1, M2, M3, M4, N1 . . . O4, P1, P2, P3 and P4. As seen in FIG. 5, a pixel of interest, A is located in sub-image N3. The dash-line rectangle, 9a, connects the centers of sub-images N2, N3, O2 and O3. The pixel A is also located in the dash-line rectangle 9a and therefore, the sub-image transforms of N2, N3, O2 and O3 will be combined to form the output transform for the pixel of interest, A. Alternately, if pixel B is the pixel of interest, the sub-image transforms of sub-images M3, M4, N3 and N4 will be combined to form the output transform. Sub-images M3, M4, N3 and N4 are chosen given that pixel B is enclosed by dash-line rectangle, 9b, which connects the centers of the four sub-images. Furthermore, if pixel C is the pixel of interest, the transforms from sub-images N3, N4, O3 and O4 are combined to form the output transform since pixel C is contained in the dash-line rectangle, 9c, formed by connecting the centers of the above stated sub-images. As can be seen from the example, even though all three pixels A, B and C, are contained in the same sub-image, different output transforms are generated and applied to the pixels. The four TRCs are combined as a bilinear interpolate which is applied to the color converted input image Y, thereby producing the output image $Y_{out}$. The bilinear interpolate creates new luminance values for new pixels so as to recreate the resolution of the original input image for the output image, $Y_{out}$.

Finally, in step 120, an inverse color space conversion is applied to the output image $Y_{out}$. In the exemplary embodiment, the output image ($Y_{out}$) along with the corresponding chrominance component values is converted back into the RGB color space resulting in a contrast enhanced image, $I_{enhanced}$. The chrominance values of the input image Y can be normalized such that the ratio of the chrominance values to the luminance values is maintained. Therefore, for $I_{enhanced}$, $R_{enhanced} = \alpha * (R_{in} * Y_{out}/Y_{in}) + (1-\alpha) * (R_{in} + Y_{out} - Y_{in})$,
$G_{enhanced} = \alpha * (G_{in} * Y_{out}/Y_{in}) + (1-\alpha) * (G_{in} + Y_{out} - Y_{in})$ and
$B_{enhanced} = \alpha * (B_{in} * Y_{out}/Y_{in}) + (1-\alpha) * (B_{in} + Y_{out} - Y_{in})$, wherein α is an adjustable constant.

Figure 3:
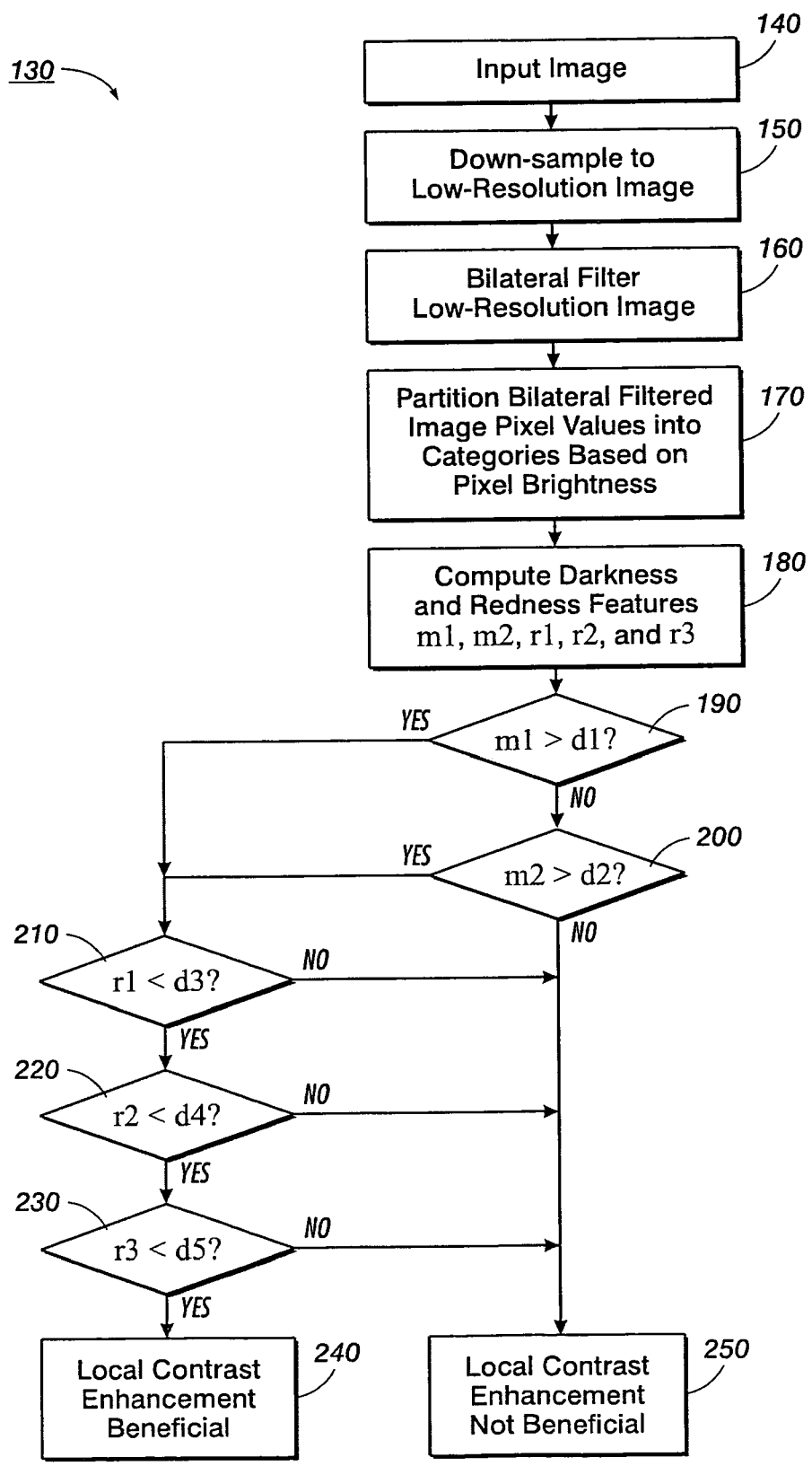
FIG. 3 is a flow chart illustrating a method for practicing an exemplary embodiment.

Referring to FIG. 3, an efficient decision and/or determination method 130 for determining if local contrast enhancement will be beneficial to the input image is shown. The method shown in FIG. 3 further describes the contrast enhancement classifier 60 of FIG. 2. An input image 140 is received into the system 10 (FIG. 1). In step 150, the input image 140 is down-sampled into a low-resolution version of the image. In the down-sampled version of the image, suitably small groups of pixels, for example 2×2 or 3×3 groups, are averaged to form a new single pixel representative of the small group of pixels. Therefore, some of the pixels of the original input image are discarded, producing a lower-resolution image of the original. The down-sampling process may be the same as in step 80 of FIG. 2 described above or alternatively may be a separate process.

In step 160, the low-resolution image is low-pass filtered using a bilateral filter. The bilateral filter smoothes the background of the image while preserving the edges of the image. As explained above, an output pixel of interest is computed using a weighted average of the surrounding pixels. The weight given to a surrounding pixel is determined by the spatial closeness of the pixel to the pixel of interest and by the similarity of the surrounding pixel's luminance value to the luminance value of the pixel of interest. Again, the bilateral filter process here may be the same as the process used in step 90 of FIG. 2 as described above or alternatively it may be a separate process.

Step 170 denotes partitioning and/or bucketing the pixels of the filtered image into categories which are based upon the luminance values or brightness of the pixels. Suitably, the pixel luminance values are grouped into at least two categories. However, the number of categories may be more or less such as partitioning the values into two, three, four or more categories up to a maximum number of categories which corresponds to the number of gray levels of the image. In the exemplary embodiment, the pixel luminance values are divided into four categories. The categories have limits which correspond to the transitions of the luminance gain curve of the image. The luminance gain curve, as seen in FIG. 4, describes the gain function G(Y) of the image and maps the luminance value of the bilaterally filtered input pixels (B) to the luminance values of the output pixels (Y*G(Y)). The graph of FIG. 3 shows three gain curves. Curve I corresponds to no luminance value gain, curve II corresponds to luminance value gain derived by dividing the input pixel's luminance value by some power factor of the background pixels' luminance values and curve III shows the luminance value gain of the exemplary embodiment.

As can be seen in FIG. 3, the curve of the exemplary embodiment, curve III, show two distinct transitions or changes in the gain curve. The first transition occurs when the input luminance value reaches approximately 18 units, i.e. Y=18. The second transition in the gain curve occurs when the input luminance value reaches approximately 160, i.e. Y=160 units. In the exemplary embodiment, these values of luminance are used as the limits of the categories for the classifier method 130. Category 1 contains the pixels with luminance values less than 18 units (Y<18). Category 2 contains the pixels with luminance values between 18 and 54 units (18≦Y<54). The value of 54 units (=3 times 18) was chosen for a limit of category 2 because it is the maximum value for pixels in the darkest regions of the input image after enhancement. Category 3 contains pixels with luminance values between 54 and 160 units (54≦Y<160) and category 4 contains pixels with luminance values greater than or equal to 160 units (Y≧160). Note, the values of the luminance used herein have arbitrary units associated with them. In this way, the luminance values are meaningful in relation to or when compared to each other.

Referring back to FIG. 3, after the pixels have been categorized according to their luminance value, in step 180 darkness features of the image are extracted and/or computed from the filtered image. The darkness features relate to the luminance values of the pixels of the image. Also, if the image is a color image, redness features may be extracted and/or computed wherein the redness features relate to the red component values of the pixels in the image. In the exemplary embodiment, two darkness features are defined and they measure the ratio of dark pixels to the total number of pixels in the image. Three redness features are defined which measure the value and/or influence of the red color component values of the pixels in the darker regions of the image. User experiments have shown that when images, on a whole, are relatively bright, local contrast enhancement is not perceived as giving value or benefiting the image. These experiments also demonstrated that when undesirable noise in the dark regions of the image was enhanced the image was not seen as benefiting from the enhancement but actually was perceived as being damaged by the enhancement, i.e. the image was perceived to be more appealing to a user or observer without any contrast enhancement or was perceived to be more appealing with global contrast enhancement than the image was with local contrast enhancement.

In the exemplary embodiment, suitably, five features are computed in step 180 of FIG. 3. For example, the first darkness feature, m1, is defined as the number of pixels in category 1 (Y<18) divided by the total number of pixels in the image. The second darkness feature, m2, is defined as the number of pixels in category 2 (18≦Y<54) divided by the total number of pixels in the image. Suitably, only the darkest regions of the input image, i.e. those relating to the darker categories, e.g. the first two categories, are used in the decision method. The first redness feature, r1, is defined as the median of the red component values (R of the RGB color space) of the pixels in category 1. The second redness feature, r2, is defined as the median of the red component values of the pixels in category 2 and the third redness feature, r3, is defined as the median of the red component values of the pixels in category 3. It will be appreciated that red component values for fewer than all the categories may alternately be employed or the redness features may be omitted all together. Particularly, the red component values for those categories for which it is determined that the redness feature has little or no influence in user and/or observer preferences may be omitted or ignored.

In the exemplary embodiment, the five features are then compared to threshold values (d1, d2, d3, d4 and d5) and combined using Boolean operators into a classifying expression. Suitably, the threshold values can be determined experimentally and/or empirically as is described herein below. An exemplary classifying expression is defined in steps 190-230. In steps 190 and 200, the darkness features, m1 and m2 are compared to their respective threshold values d1 and d2. If either m1 or m2 is greater than d1 or d2 respectively, the method moves to step 210, where if both m1 and m2 are less than or equal to d1 and d2 respectively, then the method moves to step 250 and the classifier determines that local contrast enhancement is not beneficial to the input image and therefore the input image does not receive local contrast enhancement. In steps 210-230, the redness features of the image are compared to their respective threshold values. If r1, r2 or r3 is greater than or equal to their respective threshold values, d3, d4 and d5, then the classifier method moves to step 250 determining that local contrast enhancement is not beneficial to the input image and therefore should not be performed on the image. However, if r1, r2 and r3 are all less than their respective threshold values, d3, d4 and d5, then the method moves to step 240 and the classifier determines that the input image will benefit from and is to receive local contrast enhancement.

As can be seen from steps 190-230 above, the Boolean expression is as follows:

$$D=((m1>d1) \text{ OR } (m2>d2)) \text{ AND } (r1<d3) \text{ AND } (r2<d4) \text{ AND } (r3<d5)$$

The values of terms d1, d2, d3, d4 and d5 are the respective threshold values of the five features and the result of the expression D is either true or false. "True" indicates that the input image will benefit from local contrast enhancement and therefore should receive local contrast enhancement. "False" indicates that the input image will not benefit from local contrast enhancement and therefore should not receive local contrast enhancement. In this manner, the classification of the images is determined by the comparisons of the features to their respective threshold values.

Suitably, the threshold values and the Boolean operators are learned and/or selected based on experimentation and/or empirical evidence. For example, in the exemplary embodiment the threshold values and the Boolean expression (comparing the threshold values to the image features) were selected based on a training set of fifty (50) images which were evaluated by a group of thirty (30) users/observers. For each image of the training set, three empirical probabilities were computed. They were the probability that the user/observer prefers a local contrast enhanced image (P), the probability that a user/observer prefers a global contrast enhanced image (O) and the probability that a user/observer has no preference (R). For the classifier in the experiment, any image for which P>0.5 AND Q<0.25 was considered a positive example, i.e. the image should receive local contrast enhancement. All images that did not meet these criteria were considered negative examples, i.e. images that should not receive local contrast enhancement. A brute-force search was performed, over reasonable intervals, to find the thresholds of the optimal classifier. The brute-force search entailed exhaustively trying possible combinations of threshold data, over a reasonable interval, in the classifying expression to determine which threshold criteria produced the optimal classifier. That is to say, the search entailed trying combinations of threshold values in the comparisons of the Boolean equation until the threshold values produced a classifier which meet the specified criteria, e.g. P>0.5 AND Q<0.25, with the least amount of error. The error referring to the number of misclassified images divided by the total number of images. The search resulted in obtaining the following values for the thresholds of the classifier:

d1=−0.4, d2=0.2, d3=0.0, d4=0.1 and d5=0.1.

The threshold values determined above reflect a normalization of the image features. The features were computed and then normalized by subtracting the mean and then dividing by the standard deviation. Therefore, the classifier expression using the threshold values as determined by the user experiments becomes:

$$D=((m1>-0.4) \text{ OR } (m2>0.2)) \text{ AND } (r1<0.0) \text{ AND } (r2<0.1) \text{ AND } (r3<0.1).$$

It will be appreciated that other threshold values based on further experimentation and empirical data may alternatively be used.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for contrast enhancement of an input image, the method comprising:
    filtering a down-sampled image with a low-pass filter;
    partitioning the down-sampled image into a set of sub-images;
    deriving a sub-image transform for at least one of the sub-images mapping pre-filtered luminance values of the sub-image to post-filtered luminance values of the sub-image;
    selecting at least one of sub-image transforms for a pixel of interest in the input image;
    generating an output transform from the selected sub-image transforms;
    applying the output transform to the pixel of interest in the input image; and
    determining if the input image is to receive local contrast enhancement wherein the determination comprises:
        applying the low-pass filter to a low-resolution version of the input image resulting in enhanced luminance values for pixels in the low-resolution image;
        partitioning the pixels of the filtered image into at least a first and second category based on luminance values of the pixels;
        computing characteristic darkness features of the filtered image using the categories of luminance values of the pixels; and
        comparing the darkness features of the image to threshold values, wherein comparing the darkness features to threshold values comprises combining the comparisons into a Boolean expression which returns a true or false result as to whether or not the image is to receive local contrast enhancement;
    wherein computing features and comparing features includes computing redness features using red component values of the pixels of the image and comparing the redness features to threshold values wherein the comparisons are combined into the Boolean expression.

2. The method of claim 1 wherein applying the low-pass filter comprises applying a bilateral filter to the down-sampled image generated by down-sampling the luminance values of the input image.

3. The method of claim 1 further comprising converting color information for the input image into a color space having a luminance component.

4. The method of claim 3 wherein converting color information comprises converting the color information into YIQ color space having a luminance component Y and chrominance components I and Q.

5. The method of claim 1 wherein deriving a sub-image transform comprises deriving a histogram of the sub-image wherein the histogram plots a number of pixels corresponding to at least some of the luminance values of the sub-image and estimating a monotonic tone reproduction curve of the sub-image based on the histogram of the sub-image such that cost is minimized.

6. The method of claim 5 wherein the monotonic tone reproduction curve is estimated using monotonic dynamic programming.

7. The method of claim 1 wherein generating an output transform from the selected sub-image transforms comprises combining the transforms from the four neighboring sub-images of the pixel of interest and wherein applying the output transform comprises recomposing an enhanced red-green-blue output image.

8. A method to determine if an input image is to receive local contrast enhancement, the method comprising:
   applying a bilateral filter to the input image resulting in enhanced luminance values for pixels in the image;
   partitioning the pixels of the filtered image into at least a first and second category based on the luminance values of the pixels;
   computing characteristic darkness features of the filtered image using the categories of luminance values of the pixels; and
   comparing the darkness features of the image to threshold values;
   wherein computing and comparing features includes computing redness features of the image using red component values of the pixels of the image and comparing the redness features of the image to threshold values and wherein computing darkness features comprises computing a ratio of number of pixels in one of the categories comparing the darkness features of the image to threshold values comprises combining the comparisons into a Boolean expression which returns a true or false result as to whether or not the input image is to receive local contrast enhancement.

9. A method to determine if an input image is to receive local contrast enhancement, the method comprising:
   applying a bilateral filter to the input image resulting in enhanced luminance values for pixels in the image;
   partitioning the pixels of the filtered image into at least a first and second category based on the luminance values of the pixels;
   computing characteristic darkness features of the filtered image using the categories of luminance values of the pixels; and
   comparing the darkness features of the image to threshold values;
   wherein computing features further comprises:
      computing a first darkness feature as a ratio of number of pixels in the first category of luminance values to the total number of pixels in the image;
      computing a second darkness feature as a ratio of number of pixels in the second category of luminance values to the total number of pixels in the image;
      computing a first redness feature as a median of the red component values of pixels in the first category of luminance values;
      computing a second redness feature as a median of the red component values of pixels in the second category of luminance values; and
      computing a third redness feature as a median of the red component values of pixels in a third category of luminance values.

10. The method of claim 9 wherein applying a bilateral filter comprises applying the bilateral filter to a low resolution version of the input image.

11. The method of claim 9 wherein comparing includes comparing the darkness and redness features to threshold values and further comprises combining the comparisons into a Boolean expression which returns a true or false result as to whether or not the input image is to receive local contrast enhancement.

* * * * *